United States Patent
Zou et al.

(10) Patent No.: US 9,874,928 B2
(45) Date of Patent: Jan. 23, 2018

(54) DNP3 BASED ETHERNET PORT POWER SAVING FOR SOLAR POWER ENERGIZED RTU SYSTEM

(71) Applicant: Honeywell International Inc., Morristown, NJ (US)

(72) Inventors: Ke Zou, Shanghai (CN); Enkui Lv, Shanghai (CN); Yanqiu Wang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/745,726

(22) Filed: Jun. 22, 2015

(65) Prior Publication Data

US 2016/0370853 A1    Dec. 22, 2016

(51) Int. Cl.
*G06F 1/32* (2006.01)
*G06F 1/26* (2006.01)
*G06F 1/30* (2006.01)
*H02J 7/35* (2006.01)

(52) U.S. Cl.
CPC ............ *G06F 1/3296* (2013.01); *G06F 1/266* (2013.01); *G06F 1/305* (2013.01); *G06F 1/3212* (2013.01); *H02J 7/35* (2013.01); *Y02B 60/1292* (2013.01)

(58) Field of Classification Search
CPC .... G06F 1/3287; G06F 1/3206; G06F 1/1694; Y02B 60/50; Y02B 60/1282
See application file for complete search history.

(56) References Cited

U.S. PATENT DOCUMENTS 8,060,053 B2   11/2011   Hirsch

| | | |
|---|---|---|
| 8,072,098 B2 | 12/2011 | Elias et al. |
| 8,392,626 B2 | 3/2013 | Wormmeester et al. |
| 8,656,065 B1 | 2/2014 | Gerhart et al. |

(Continued)

FOREIGN PATENT DOCUMENTS

| JP | 2007527073 A | 9/2007 |
|---|---|---|
| WO | WO 2005/086110 A2 | 9/2005 |
| WO | WO 2015/148106 A1 | 10/2015 |

OTHER PUBLICATIONS

Yang, et al.; U.S. Appl. No. 14/670,328 entitled "Master/Slave Management for Redundant Process Controller Modules"; filed Mar. 26, 2015; 25 pages.
The International Searching Authority, "Notification of Transmittal of the International Search Report and the Written Opinion of The International Search Authority, or the Declaration," International Application No. PCT/US2016/035981, dated Sep. 8, 2016, 5 pages.

(Continued)

*Primary Examiner* — Mohammed Rehman
*Assistant Examiner* — Alyaa T Mazyad (57) ABSTRACT

A system includes a control system and a Remote Terminal Unit (RTU). The control system is configured to communicate data with one or more field devices via the RTU. The RTU is configured to transmit received data from the one or more field devices and the control system. The RTU is also configured to activate a power saving mode that selectively provides power to transmit the received data. The RTU is further configured to, while the power saving mode is activated, prevent power from being provided to transmit the received data, and store the received data in a memory of the RTU when the power is not provided to transmit the received data. The RTU is configured to, while the power saving mode is activated, provide power to transmit the received data after storing the received data in the memory of the RTU.

20 Claims, 5 Drawing Sheets

(56) References Cited

U.S. PATENT DOCUMENTS

| | | |
|---|---|---|
| 2002/0147503 A1 | 10/2002 | Osburn, III |
| 2002/0155832 A1* | 10/2002 | Stucky ................ H04Q 9/00 |
| | | 455/426.1 |
| 2004/0264396 A1* | 12/2004 | Ginzburg .......... H04W 52/0232 |
| | | 370/311 |
| 2006/0240818 A1 | 10/2006 | McCoy et al. |
| 2007/0094519 A1* | 4/2007 | Yamamoto ............ G06F 1/3203 |
| | | 713/300 |
| 2009/0116405 A1* | 5/2009 | Hakala-Ranta ......... H04L 12/42 |
| | | 370/254 |
| 2009/0271558 A1 | 10/2009 | Wormmeester et al. |
| 2011/0103315 A1* | 5/2011 | Camp, Jr. ............. H04L 1/1854 |
| | | 370/329 |
| 2012/0290735 A1 | 11/2012 | Johnson et al. |
| 2013/0275572 A1 | 10/2013 | Schaetzle et al. |
| 2014/0013144 A1 | 1/2014 | Nakagawa et al. |
| 2015/0084747 A1 | 3/2015 | McLaughlin et al. |
| 2015/0085731 A1* | 3/2015 | Jiang ................... H04W 74/02 |
| | | 370/311 |
| 2015/0130276 A1 | 5/2015 | McNeill-McCallum et al. |
| 2015/0278144 A1 | 10/2015 | McLaughlin et al. |
| 2015/0282069 A1* | 10/2015 | Hobbs ............... H04W 52/0206 |
| | | 370/252 |

OTHER PUBLICATIONS

The International Searching Authority, "Written Opinion of The International Searching Authority," International Application No. PCT/US2016/035981, dated Sep. 8, 2016, 7 pages.
"Dual FET Bus Switch, 2.5-V/3.3-V Low Voltage High-Bandwidth Bus Switch", Texas Instruments, Dec. 2002—Revised Jan. 2011, 25 pages.
International Search Report dated Jun. 10, 2015 in connection with International Patent Application No. PCT/US2015/019671; 4 pages.
Written Opinion of the International Searching Authority dated Jun. 10, 2015 in connection with International Patent Application No. PCT/US2015/019671; 7 pages.
"Dual FET Bus Switch, 2.5-V/3.3-V Low Voltage High-Bandwidth Bus Switch", Texas Instruments, Oct. 2003—Revised Oct. 2009, 14 pages.
"SN74CB3Q3305 Dual FET Bus Switch, 2.5-V/3.3-V Low Voltage High-Bandwidth Bus Switch", Texas Instruments, Oct. 2003—Revised Nov. 2015, 13 pages.
McLaughlin et al., U.S. Patent Application "Remote Terminal Unit (RTU) With Wireless Diversity and Related Method", U.S. Appl. No. 14/035,557, filed Sep. 24, 2013. 33 pages.
McLaughlin et al., U.S. Patent Application "Remote Terminal Unit (RTU) With Universal Input/Output (UIO) and Related Method", U.S. Appl. No. 14/228,142, filed Mar. 27, 2014, 53 pages.

\* cited by examiner

DNP3 BASED ETHERNET PORT POWER SAVING FOR SOLAR POWER ENERGIZED RTU SYSTEM

TECHNICAL FIELD

This disclosure is generally directed to industrial process control and automation systems. More specifically, this disclosure is directed to an apparatus and method for Ethernet port power saving for solar power energized remote terminal unit (RTU) systems.

BACKGROUND

An RTU represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to an automation system. The automation system can execute control logic and alter the operations of actuators at the different sites via the RTUs. The RTUs themselves could also incorporate algorithms for data analytics.

In general, RTUs have increased in usage and complexity from their early designs in the 1970s. Today, RTUs often need to reliably support a large set of application-specific network capabilities and protocols, as well as support a number of control execution models and provide smart device integration.

SUMMARY

This disclosure provides an apparatus and method for Distributed Network Protocol 3 (DNP3) based Ethernet Port Power Savings for Solar Power Energized RTU systems.

In a first embodiment, a system is provided. The system includes a control system and a Remote Terminal Unit (RTU). The control system is configured to communicate data with one or more field devices via the RTU. The RTU is configured to transmit received data from the one or more field devices and the control system. The RTU is also configured to activate a power saving mode that selectively provides power to transmit the received data. The RTU is further configured to, while the power saving mode is activated, prevent power from being provided to transmit the received data, and store the received data in a memory of the RTU when the power is not provided to transmit the received data. In addition, the RTU is configured to, while the power saving mode is activated, provide power to transmit the received data after storing the received data in the memory of the RTU.

In a second embodiment, a Remote Terminal Unit (RTU) is provided. The RTU includes an Input/Output (I/O) module. The I/O module is configured to transmit received data when receiving power. The RTU also includes processing circuitry. The processing circuitry is configured to activate a power saving mode that selectively provides power to the I/O module to transmit the received data. The processing circuitry is also configured to, while the power saving mode is activated, prevent power from being provided to the I/O module, and store the received data in a memory of the RTU when the power is not provided to the I/O module. The processing circuitry is further configured to, while the power saving mode is activated, provide power to the I/O module to transmit the received data after storing the received data in the memory of the RTU.

In a third embodiment, a method is provided. The method includes activating a power saving mode of a Remote Terminal Unit (RTU) that selectively provides power to an Input/Output (I/O) module of the RTU to transmit received data. The method also includes, while the power savings mode is activated, preventing power from being provided to the I/O module, and storing the received data in a memory of the RTU when the power is not provided to the I/O module. The method further includes, while the power saving mode is activated, providing power to the I/O module to transmit the received data after storing the received data in the memory of the RTU.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 2 through 4C illustrate details of example RTUs according to this disclosure.

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

As noted above, remote terminal units (RTUs) have increased in complexity from their early designs, and current RTUs often need to reliably support a number of more advanced features. RTUs are also widely used in remote areas, where there may be no central power supply and an RTU may need to be energized by solar power, which may include solar panels, deep cycle batteries, and steel work. The more power consumed by an RTU, the greater the required capacity of the solar power. Deep cycle batteries in solar power solutions can incur significant costs in these systems. As additional batteries are needed, larger panels are required and thus more steel work is required to create those panels. With additional steel work, material costs, transportation costs, installation costs, RTU solutions with large solar panels and heavy batteries are even more expensive. As disclosed herein, a method and apparatus is provided to reduce the RTU daily power consumption in order to reduce energy consumption and costs.

Figure 1:
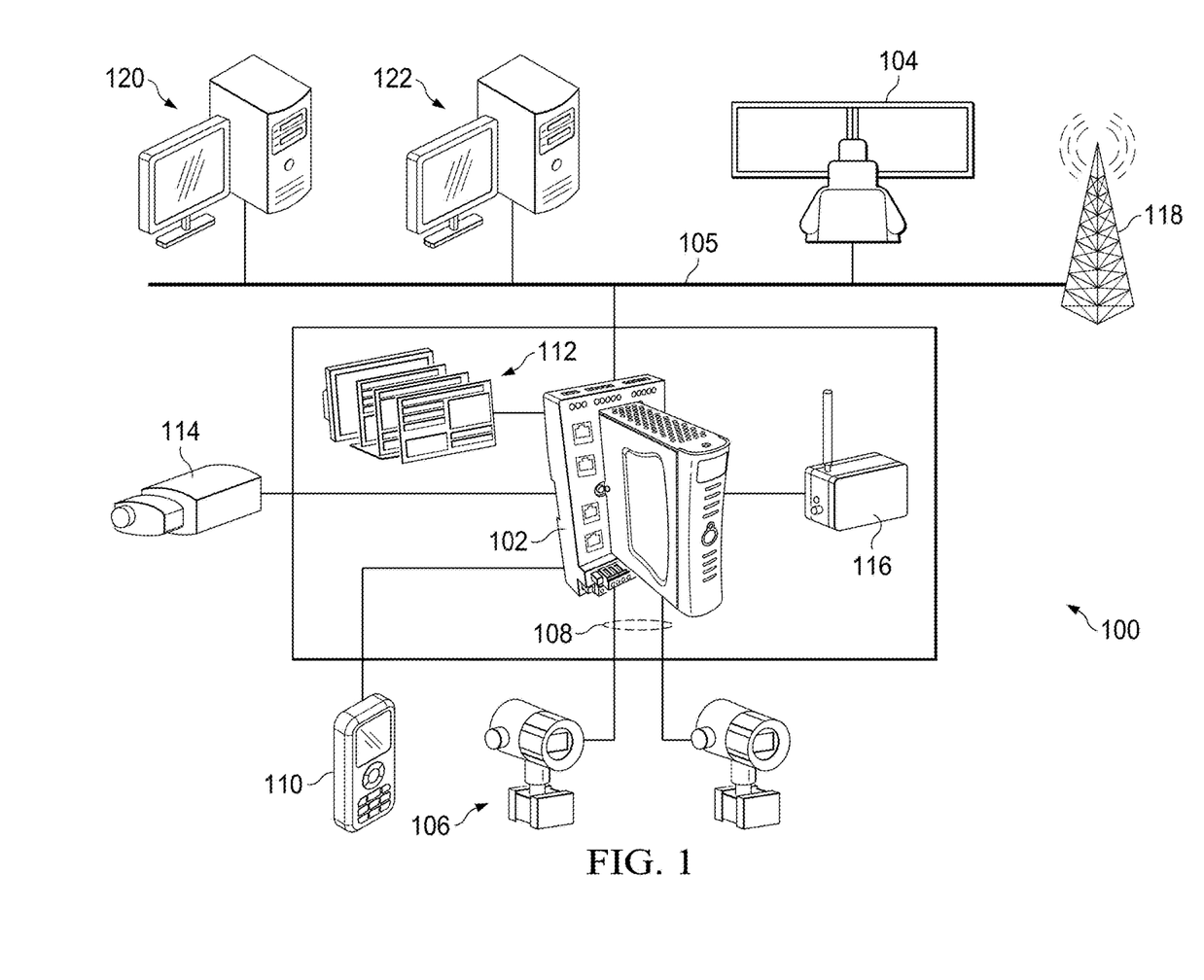
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

The RTU 102 has the ability to support a flexible mix of input/output (I/O) channel types. For example, the channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Some RTUs 102 can achieve a desired mix of I/O channel types using I/O cards that have a fixed number of inputs and outputs, where each input or output is fixed to a particular type. Other RTUs 102 can achieve a desired mix of I/O channel types using I/O cards with reconfigurable inputs or outputs. Moreover, some RTUs 102 can be expandable so that one or more I/O modules (each with one or more I/O channels) can be used with the RTUs 102.

In particular embodiments, the RTU 102 can have one, some, or all of the following features. First, the RTU 102 can support low-power operation, such as from about 1.8 W to about 4 W, and "solar powered with battery backup" operations. Second, the RTU 102 can support operation in extended temperature ranges, such as from about −40° C. to about +75° C. Third, the RTU 102 can support expansion so that a configurable number of I/O channels can be used with the RTU 102. Fourth, the RTU 102 can support a variety of control execution methods, such as function block, ladder logic, user-structured text and programming, and sequence operations. Fifth, the RTU 102 can support two-, three-, or four-wire analog inputs and outputs for both field and device-powered transmitters and smart valve positioners. Sixth, the RTU 102 can support other I/O types without restriction in terms of mix, including AI, AI with digital communication, AO, AO with digital communication, DI (including digital input sequence of event or "DI-SOE" inputs), DO, and PI. Seventh, the RTU 102 can support RTU control module redundancy. Eighth, the RTU 102 can support RTU pricing, which is lower than conventional distributed control system (DCS) devices.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 can be used. One or more RTUs could be used in any other suitable system.

Figure 2:
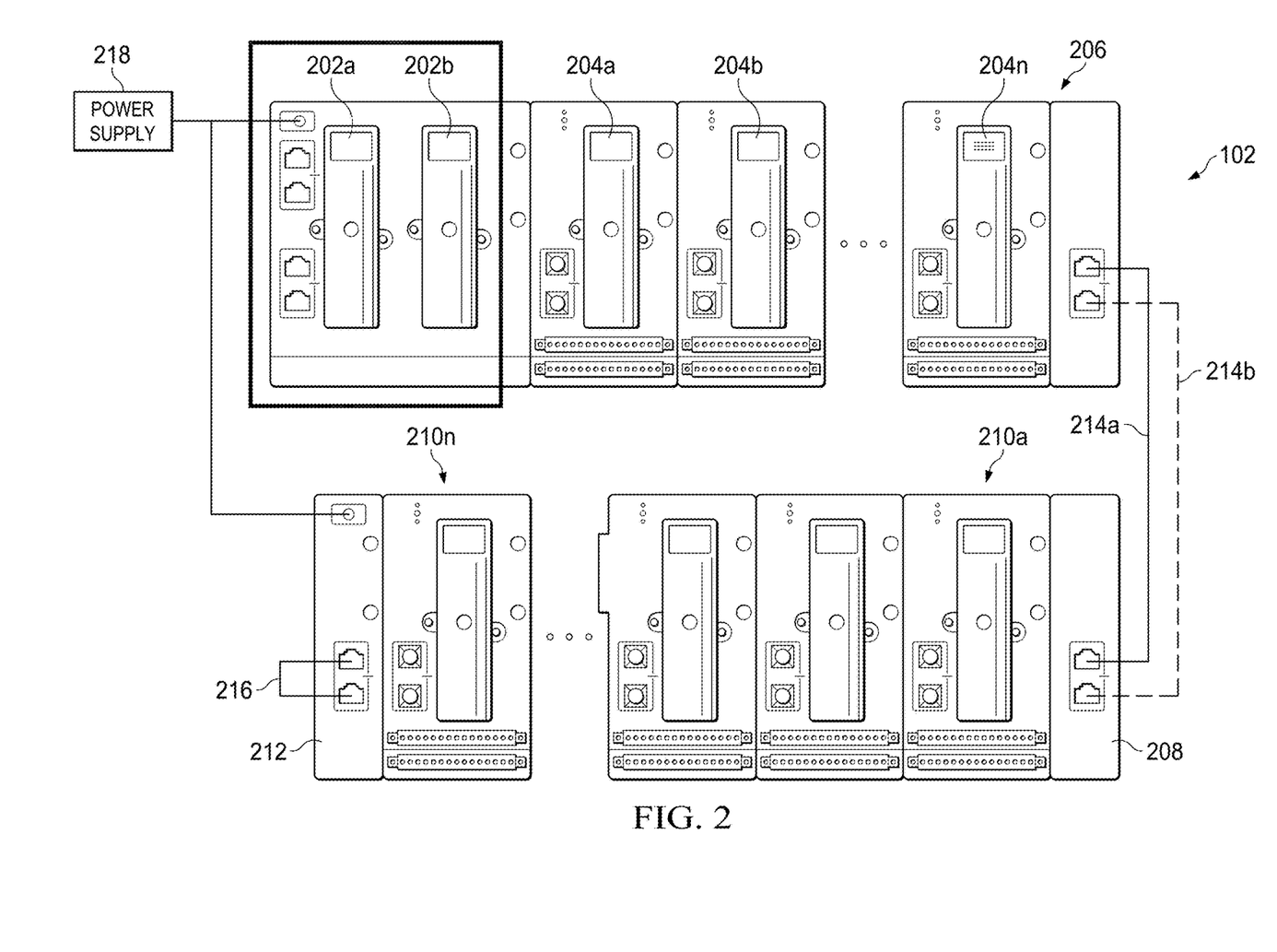

FIG. 2 illustrates details of an example RTU 102 according to this disclosure. For ease of explanation, the RTU 102 is described as being used in the system 100 of FIG. 1. However, the RTU 102 could be used in any other suitable system.

FIG. 2 illustrates an example of the RTU 102 with redundant controller modules 202a-202b, a first set of I/O modules 204a-204n, and an expansion board 206. Each controller module 202a-202b represents a module that executes control logic and other functions of the RTU 102. For example, each controller module 202a-202b could execute control logic that analyzes sensor data and generates control signals for actuators. Each controller module 202a-202b could also execute functions that control the overall operation of the RTU 102, such as functions supporting communications with external devices or systems. Each controller module 202a-202b includes any suitable structure for controlling one or more operations of an RTU. In some embodiments, each controller module 202a-202b includes at least one processing device that executes a LINUX or other operating system.

The I/O modules 204a-204n support communications between the controller modules 202a-202b and external devices or systems (such as the field devices 106) via I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as needed. The circuitry can be used to configure and reconfigure each I/O channel as desired. For instance, example types of reconfigurable I/O channels are shown in U.S. Pat. No. 8,072,098; U.S. Pat. No. 8,392,626; and U.S. Pat. No. 8,656,065 (all of which are hereby incorporated by reference in their entirety). Also, the use of reconfigurable I/O channels in an RTU is described in U.S. patent application Ser. No. 14/228,142 (which is hereby incorporated by reference in its entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller modules 202a-202b are implemented using separate circuit boards. Communications between the redundant controller modules 202a-202b could occur via various communication interfaces of the circuit boards. If the redundant controller modules 202a-202b are present in the RTU 102 (which need not always be the case), the RTU 102 can automatically manage which redundant controller module has control of each I/O module and provide seamless switchover upon a failure of a controller module.

Although FIG. 2 illustrates details of an example RTU 102, various changes may be made to FIG. 2. For example, the number(s) and type(s) of ports and interfaces shown in FIG. 2 are for illustration only. Also, the functional divisions of the RTU 102 shown in FIG. 2 are for illustration only. Various components in FIG. 2 could be omitted, combined, or further subdivided and additional components could be added according to particular needs.

Figure 3:
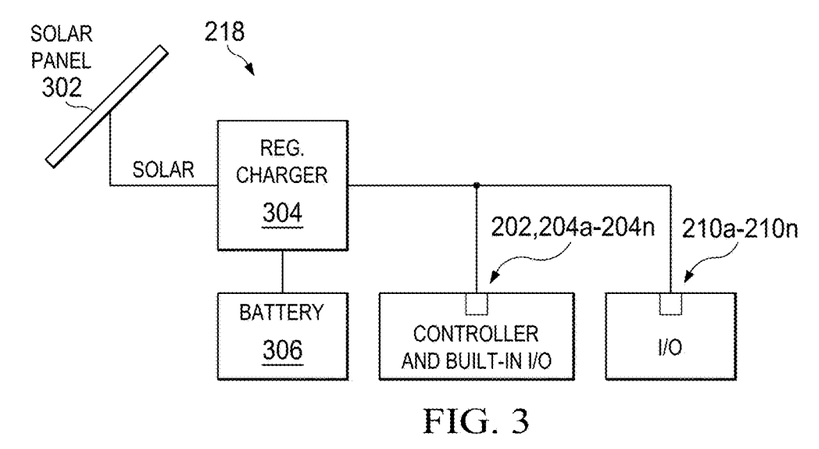

FIG. 3 illustrates an example power supply 218 that could be used with the RTU 102. For ease of explanation, the power supply 218 used with the RTU 102 can be implemented in the system 100 of FIG. 1. However, the power supply 218 used with the RTU 102 can be implemented in any other suitable system.

As shown in FIG. 3, the power supply 218 includes at least one solar panel 302, a regulated charger 304, and at least one battery 306. Each solar panel 302 includes any suitable structure for converting solar energy into electrical energy. In some embodiments, one or more solar panels 302 generate a direct current (DC) voltage of between 10-30 VDC.

The regulated charger 304 converts electrical energy into a form suitable for use by components of the RTU 102. For example, the regulated charger 304 could convert the 10-30 VDC signal from the solar panel(s) 302 into a 24 VDC signal for the controller module 202 and the I/O modules 204a-204n (as well as any additional I/O modules, such as I/O modules 210a-210n). The regulated charger 304 also provides electrical energy from the solar panel(s) 302 to the one or more batteries 306 for charging of the batteries 306. The regulated charger 304 can further provide electrical energy from the one or more batteries 306 to the components of the RTU 102 to supplement or replace electrical energy from the solar panel(s) 302. This could occur, for instance, during times when the solar panel(s) 302 cannot generate adequate power (such as at night or during bad weather).

Although FIG. 3 illustrates details of an example power supply 218 that could be used RTU 102, various changes may be made to FIG. 3. For example, the number(s) and type(s) of modules shown in FIG. 3 are for illustration only. Also, the functional divisions of the RTU 102 shown in FIG. 3 are for illustration only. Various components in FIG. 3 could be omitted, combined, or further subdivided and additional components could be added according to particular needs.

Figure 4A:
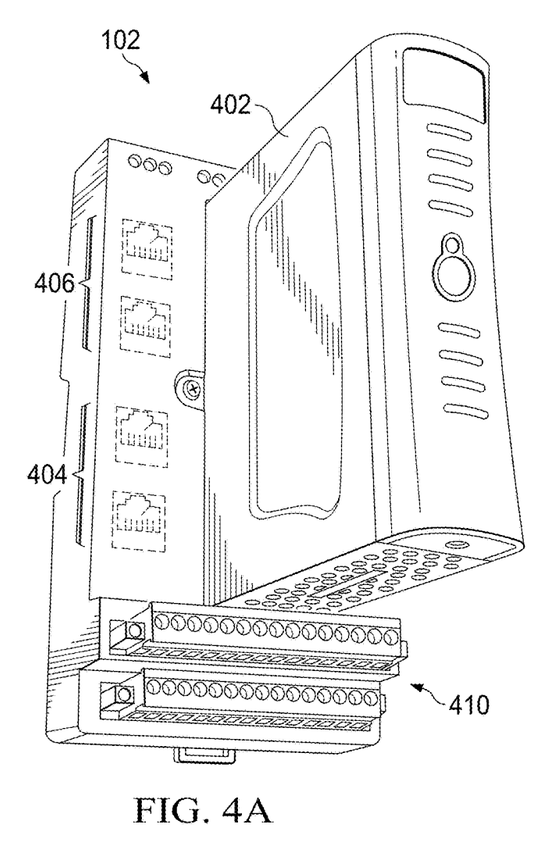
Figure 4B:
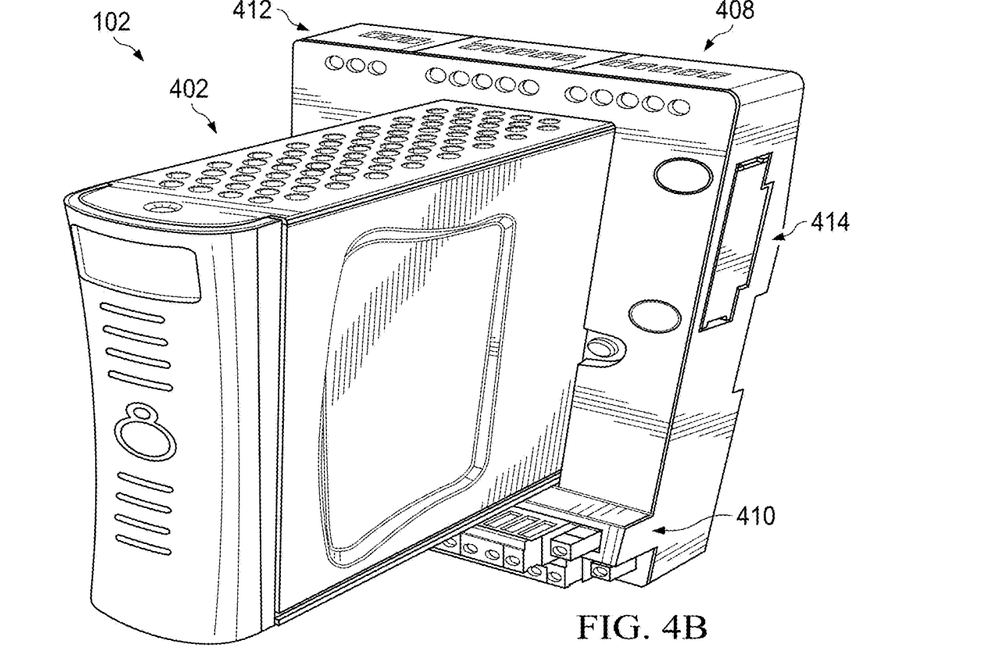
Figure 4C:
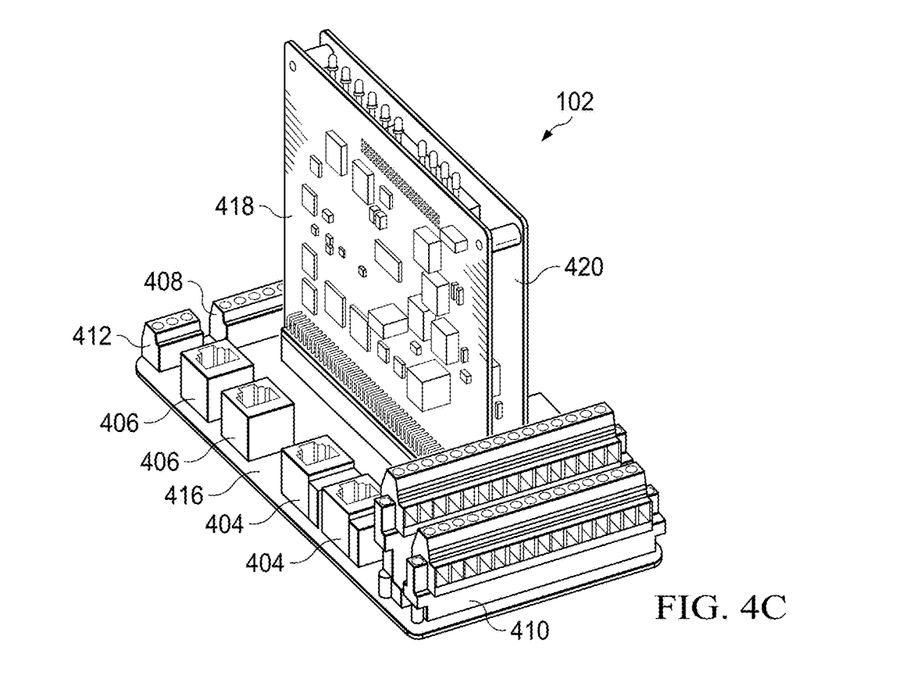

FIGS. 4A through 4C illustrate additional details regarding the example RTU 102. A housing 402 is used to encase and protect other components of the RTU 102. The housing 402 also provides access to various other components of the RTU 102, such as one or more ports or terminals. The housing 402 can have any suitable size, shape, and dimensions and be formed from any suitable material(s) (such as metal or ruggedized plastic).

The RTU 102 also includes two uplink/downlink ports 404, two RS232 ports 406, and two RS485 ports 408. The ports 404 can be used to couple the RTU 102 to higher-level or lower-level devices, such as the control system 104, FDM 120, or RTU builder 122 via the network 105. The ports 404 could represent any suitable structures for coupling to one or more communication links, such as Ethernet ports. The RS232 ports 406 and the RS485 ports 408 could be used to couple the RTU 102 to one or more field devices or other devices that use the RS232 or RS485 serial protocol.

Various I/O terminals 410 are also used to couple the RTU 102 to one or more field devices. The I/O terminals 410 here can be coupled to the I/O modules 204a-204n and thereby provide a communication path between the I/O modules 204a-204n and the field device(s) coupled to the I/O terminals 410. The I/O terminals 410 can be coupled to various types of field devices, and the I/O modules 204a-204n can be configured appropriately as AI (with or without digital communication), AO (with or without digital communication), DI, DO, and/or PI channels. The I/O terminals 410 include any suitable structures for coupling to different communication paths, such as screw terminals.

A power terminal 412 can be used to couple the RTU 102 to a power supply, such as the power supply 218. A slot 414 provides access to additional connectors, such as the expansion board 206 for coupling to the I/O modules 210a-210n.

Note that the numbers and types of ports and terminals shown in FIGS. 4A through 4C are for illustration only. The RTU 102 could include any suitable type(s) and number(s) of interfaces as needed or desired.

As shown in FIG. 4C, the RTU 102 further includes three printed circuit boards (PCBs). A first circuit board 416 represents the substrate on which the ports 404-408, I/O terminals 410, and other input/output components can be located. The circuit board 416 represents any suitable substrate, such as an Input Output Termination Assembly (IOTA) board. For this reason, the circuit board 416 may be referred to below as the IOTA board 416.

A second circuit board 418 and a third circuit board 420 are coupled to the IOTA circuit board 416. The second circuit board 418 represents a board having at least one processing device that executes an operating system for the RTU 102. For this reason, the circuit board 418 may be referred to below as the kernel board 418. The circuit board 418 could also include at least one memory, a power supply or power converter, and one or more communication interfaces. As a particular example, the circuit board 418 could include a field programmable gate array (FPGA).

The third circuit board 420 represents an application board that contains I/O modules, such as the I/O modules 204a-204n. The circuitry on the circuit board 420 can be used to reconfigure an I/O channel into an AI (with or without digital communication), AO (with or without digital communication), DI, DO, or PI channel. As a particular example, the circuit board 420 could include an application specific integrated circuit (ASIC) that includes the switches and other components used to provide reconfigurable I/O channels. For this reason, the circuit board 420 may be referred to below as the application board 420.

Although FIGS. 4A, 4B, and 4C illustrate details of an example RTU 102, various changes may be made to FIGS. 4A, 4B, and 4C. For example, the number(s) and type(s) of ports and interfaces shown in FIGS. 4A, 4B, and 4C are for illustration only. Also, the functional divisions of the RTU 102 shown in FIGS. 4A, 4B, and 4C are for illustration only. Various components in FIGS. 4A, 4B, and 4C could be omitted, combined, or further subdivided and additional components could be added according to particular needs.

As discussed herein, an RTU includes I/O modules (such as I/O modules 204a-204n), as illustrated in FIGS. 2-4C. The I/O modules consume a large part of the energy of a low power embedded RTU. For example, when I/O modules (such as Ethernet ports) are used for SCADA communication, peer to peer communication, or talking to field devices, these I/O modules collectively consume more than 0.6 w when working in an active mode. When using SCADA communication systems, at least one I/O module is used and one or more other I/O modules are used for redundancy.

Control systems including SCADA communication systems can use DNP3 protocol. With DNP3 protocol, an RTU (such as RTU 102) receives event information (such as commands or requests for data) from a master system (such as control system 104, illustrated in FIG. 1). The RTU subsequently transmits the event information to field devices (such as field devices 106, illustrated in FIG. 1) using I/O modules. The RTU can also receive event information (such as field data or status information) from a field device and transmit the event information to the master system.

Event information includes point values (such as SCADA point values). For example, when an RTU receives event information from the master system, processing circuitry (such as a processing device on the second circuitry board 418) of the RTU stores the point values, for example with the event information, in a memory (or buffer) creating history backfill. The point values provide an indication or address of one or more field devices (or a master system) that are to receive particular event information from the RTU. The point values can be temporarily stored in the memory until the memory is full, for example, when transmitting event information to a field device and communication between the SCADA communication system and the RTU is lost. The processing circuitry of the RTU can also stop saving point values in the memory or overwrite the oldest point values depending on the configuration of the processing circuitry or the RTU.

It should be understood that DNP3 protocol supports unsolicited responses. For example, once an RTU receives event information from a field device, the RTU can transmit the event information to the master system without receiving a request from the master system to receive the event information.

The RTU (such as processing circuitry on the second circuitry board 418) can initiate an I/O module power savings mode (herein after "IOMPSM"). The IOMPSM allows the RTU to selectively power on and power off I/O modules to transmit event information, for example, at select times or select periods of time to conserve power. In the IOMPSM, the RTU can place I/O modules in a normally power off state. The RTU also calculates one or more select durations of time that event information and point values can be stored or backfilled in the memory before I/O modules power on to transmit event information. In an embodiment, the select durations of time that event information and point values can be stored or backfilled in the memory before I/O modules are powered on to transmit event information can be calculated based on a current network speed measured, for example, by the RTU. The current network speed can also be used to calculate when and how the I/O modules are subsequently powered off. In an embodiment, the IOMPSM prevents more than one I/O module from powering on at any one time. The IOMPSM can also prevent one or more I/O modules from powering off at particular times or for particular durations of time, for example when transmission from a particular I/O module is critical.

It should be understood that the RTU, when in the IOMPSM, will automatically transmit event information when the memory storing the point values and event information is full so that no data history is loss. It should also be understood that the RTU, when in the IOMPSM, will automatically transmit event information when a system alarm or a system error (such as due to a loss in communication or a reduction in communication speed) is activated.

The IOMPSM can be applied to select I/O modules of the RTU. Select I/O modules can include Ethernet ports dedicated for SCADA communication. Once the IOMPSM is initiated, the RTU automatically calculates how long data (such as event information and point values) can be backfilled in the memory or how much data will be backfilled in the memory. The duration of time that data can be backfilled in the memory or the amount of data that can be backfilled in the memory can be based on user defined configurations or system constraints. The calculated time can serve as a basis to determine the cycle parameters to physical power off the I/O modules.

The RTU can initiate an IOMPSM in response to receiving an IOMPSM indication. An IOMPSM indication can include particular times of day for particular durations of time, particular days for particular durations of time, or the like. For example, the RTU can be powered using one or more solar panels (such as solar panels 302 illustrated in FIG. 3). When the RTU determines that the time is 8 pm (such as around the time when the sun sets), the RTU can activate the IOMPSM to conserve power as the solar panels are no longer receiving solar energy to power the RTU (or in some cases one or more batteries). In the IOMPSM, the RTU powers off one or more I/O modules and selectively powers on I/O modules during the IOMPSM to transmit event information as discussed herein. The RTU can selectively power on an I/O module when, for example, a calculated duration of time expires, the backfill of data in a memory reaches a predetermined limit, or an alarm or error signal is activated. When the RTU determines that the time is 6 am the next day (such as around the time when the sun rises again), the RTU can subsequently deactivate the IOMPSM as the solar panels are once again receiving solar energy to power the RTU. In an embodiment, the RTU can use a sensor or a lookup table to determine when the sun rises and sets and activate and deactivate the IOMPSM when the sun rises and sets.

It should be understood that the master system (such as control system 104) can be continuously trying to communicate with an RTU when the RTU is in the IOMPSM and the I/O modules are power off. When the I/O modules are powered on during the IOMPSM or when the IOMPSM is deactivated, the I/O modules can immediately transmit event information to the master system. The master system can receive the event information from the RTU device and immediately read the event information.

An IOMPSM indication can also include a particular battery charge threshold of a battery (such as regulated charger 304 or battery 306 illustrated in FIG. 3) providing power to the I/O module of an RTU. For example, a battery providing power to one or more I/O modules of an RTU can be charged using one or more solar panels (such as solar panels 302 illustrated in FIG. 3). When the RTU determines that a battery providing power to an I/O module falls below a voltage threshold, the RTU activates the IOMPSM to conserve power until the battery can be charged again so that the battery can be charged to a higher voltage threshold. For example, when the RTU determines that a battery providing power to an I/O module has a voltage that is no greater than 20% of a maximum battery voltage, the RTU activates the IOMPSM to conserve power. Subsequently, when the battery has regained charge (for example after receiving power from one or more solar panels) and the RTU determines that the battery has a voltage that is at least 80% of the maximum battery voltage, the RTU subsequently deactivates the IOMPSM.

An IOMPSM indication can include a particular battery charge time threshold of a battery providing power to the I/O module of an RTU (such as regulated charger 304 or battery 306 illustrated in FIG. 3). For example, a battery providing power to one or more I/O modules of an RTU can be charged using one or more solar panels (such as solar panels 302 illustrated in FIG. 3). When the RTU determines that a battery providing power to an I/O module will be unable to provide power after a threshold period of time, the RTU activates the IOMPSM to conserve power until the battery can be charged again, for example by the solar panels, so that the battery can provide power to the I/O modules for a longer threshold of time. For example, when the RTU determines that a battery providing power to an I/O module can only provide power to the I/O module for less than an hour before going dead, the RTU activates the IOMPSM to conserve power. Subsequently, when the battery has regained charge (for example after receiving power from one or more solar panels) and the RTU determines that the battery can provide power to the I/O modules for 13 hours before going dead, the RTU subsequently deactivates the IOMPSM.

An IOMPSM indication can include a signal from a point value of a master system (such as the control system 104 illustrated in FIG. 1) that transmits and receives data from the RTU. For example, a master system can receive a user input to activate the IOMPSM at a particular RTU. The master system transmits a signal to the RTU to activate the IOMPSM. The RTU activates the IOMPSM in response to receiving the signal. Subsequently, the master system can receive a user input to deactivate the IOMPSM at the particular RTU. The master system transmits a signal to the RTU to deactivate the IOMPSM. The RTU deactivates the IOMPSM in response to receiving the signal.

The concepts described herein are directed to reducing energy consumed by the RTU I/O modules by leveraging the history backfill functionality of the DNP3 protocol and intentionally disabling the physical I/O modules from time to time to reduce the power consumption of I/O modules.

Figure 5:
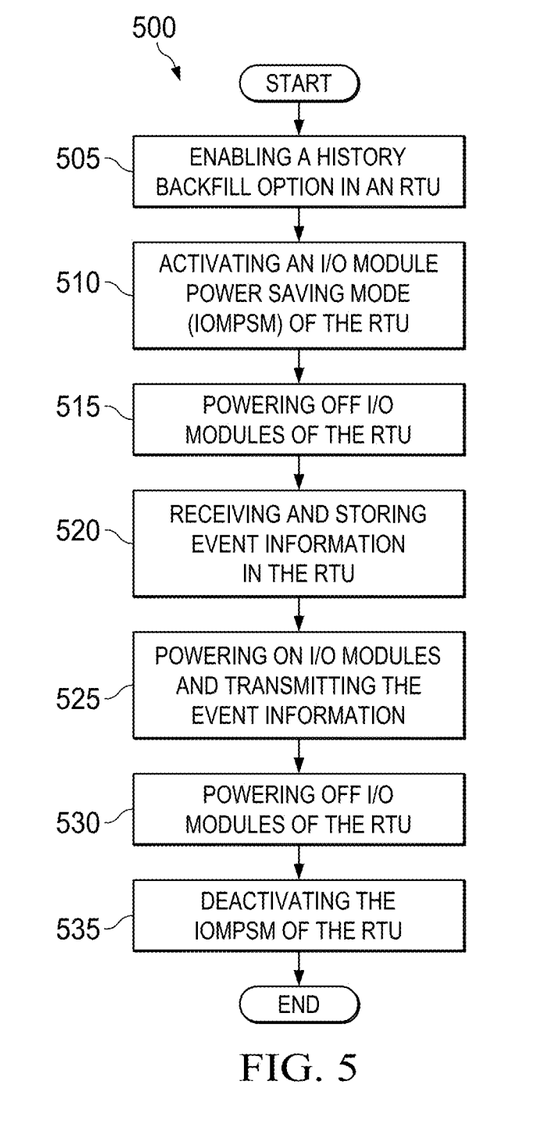
FIG. 5 illustrates an example method according to this disclosure.

FIG. 5 illustrates an example method 500 for reducing power consumption of RTU I/O modules according to this disclosure. For ease of explanation, the method 500 is described with respect to the RTUs 102 and control system 104 shown in FIGS. 1 through 4C. However, the method 500 could be used by any suitable RTU and in any suitable system.

The method 500 includes at block 505 enabling a DNP3 history backfill option for an RTU in communication with a master system (such as the control system 104 illustrated in FIG. 1). By enabling the DNP3 history backfill option for the RTU, the RTU can receive event information including point values and store the event information in a memory (such as a buffer) of the RTU to transmit the event information a predetermined period of time after receiving the event information. Processing circuitry of the RTU can initiate the DNP3 history backfill option for example before the RTU activates the IOMPSM. The control system can also transmit a signal, for example, in response to a user input or based on a programmed schedule to the processing circuitry of the RTU to command the RTU to initiate DNP3 history backfill option.

As shown at block 510, the RTU activates the IOMPSM. The IOMPSM indication can include a particular date or time, a battery charge level, a remaining amount time that a battery can provide power to an I/O module of an RTU, a time when sunlight is received by a solar panel, a reception of a signal from a control system, or the like.

Before entering the IOMPSM, the I/O modules of the RTU can be in a permanent power on state. At block 515, after activating the IOMPSM, the RTU powers off one or more I/O modules of the RTU or verifies that the one or more I/O modules of the RTU are powered off. The one or more I/O modules of the RTU can include one or more Ethernet ports. The one or more Ethernet ports can be for SCADA communication.

At block 520, the RTU receives event information including a point value and stores the event information. The RTU can receive subsequent event information with another point value and also store the subsequent event information. At block 525, the RTU selectively powers on one or more I/O modules and transmits the stored event information. The RTU can selectively power on the one or more I/O modules and transmit the stored event information when a calculated duration of time expires, the backfill of event information stored in a memory reaches a predetermined limit, an alarm or error signal is activated, or the like. Transmitting the event information after the event information has been stored for a period of time prevents the I/O modules from transmitting the event information as soon as the event information is received. By storing received event information and transmitting accumulated event information at one time or during one duration of time, the I/O modules can remain in an power off state for a longer period of time to conserve energy.

After the I/O module transmits the stored event information, at block 530 the RTU again powers off the I/O module. The RTU can also erase the stored event information so that new event information can be received and stored. At block 535, the RTU deactivates the IOMPSM. The RTU can deactivate the IOMPSM in response to a IOMPSM indication as previously discussed herein. In an embodiment, the RTU can power on the I/O modules after deactivating the IOMPSM so that the I/O modules can transmit event information immediately after receiving the event information.

Although FIG. 5 illustrates one example of a method 500 for reducing power consumption of RTU I/O modules, various changes may be made to FIG. 5. For example, while shown as a series of steps, various steps shown in FIG. 5 could overlap, occur in parallel, or occur multiple times. Moreover, some steps could be combined or removed and additional steps could be added It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a Remote Terminal Unit (RTU) comprising (i) a controller configured to control one or more operations of the RTU and (ii) an Input/Output (I/O) module configured to be communicatively coupled between the controller and one or more field devices; and
a control system configured to communicate with the one or more field devices via the RTU;
wherein the RTU is configured to:
transmit and receive data communicated between the one or more field devices and the control system,
activate a power saving mode that selectively provides power to the I/O module during the power saving mode, and
while the power saving mode is activated:
prevent the power from being provided to the I/O module in order to prevent the I/O module from transmitting received data,
store the received data in a memory of the RTU for a specified duration of time when the power is not provided to the I/O module, the specified duration of time based on a current network speed, and
provide the power to the I/O module in order to allow the I/O module to transmit the received data after storing the received data in the memory of the RTU.

2. The system of claim 1, further comprising one or more power sources configured to charge one or more batteries to provide the power to the RTU.

3. The system of claim 2, wherein the one or more power sources comprise at least one solar panel.

4. The system of claim 2, wherein the RTU is configured to activate the power saving mode in response to determining that the one or more power sources are not charging the one or more batteries.

5. The system of claim 2, wherein the RTU is configured to activate the power saving mode in response to determining that the one or more batteries are below a threshold charge or in response to determining that the one or more batteries will be below the threshold charge within a threshold period of time.

6. The system of claim 1, wherein the RTU is configured to activate the power saving mode during a particular time of day.

7. The system of claim 1, wherein the control system comprises a Supervisory Control And Data Acquisition (SCADA) system.

8. A Remote Terminal Unit (RTU) comprising:
a controller configured to control one or more operations of the RTU; and
an Input/Output (I/O) module configured to be communicatively coupled between the controller and one or more field devices, the I/O module configured to transmit and receive data communicated between the one or more field devices and the controller when receiving power;
wherein the controller is configured to:
activate a power saving mode that selectively provides power to the I/O module during the power saving mode, and
while the power saving mode is activated:
prevent the power from being provided to the I/O module in order to prevent the I/O module from transmitting received data,
store the received data in a memory of the RTU for a specified duration of time when the power is not provided to the I/O module, the specified duration of time based on a current network speed, and provide the power to the I/O module in order to allow the I/O module to transmit the received data after storing the received data in the memory of the RTU.

9. The RTU of claim 8, wherein the I/O module comprises an Ethernet port dedicated to a Supervisory Control And Data Acquisition (SCADA) system.

10. The RTU of claim 8, wherein the I/O module is configured to receive the power from one or more batteries that are charged by one or more power sources.

11. The RTU of claim 10, wherein the controller is configured to activate the power saving mode in response to determining that:
the one or more power sources are not charging the one or more batteries,
the one or more batteries are below a threshold charge, or
the one or more batteries will be below the threshold charge within a threshold period of time.

12. The RTU of claim 8, wherein the controller is configured to activate the power saving mode during a particular time of day.

13. The RTU of claim 8, wherein, while the power saving mode is activated, the controller is configured to provide the power to the I/O module to transmit the received data after storing the received data in the memory when an amount of received data stored in the memory reaches a threshold amount of received data.

14. The RTU of claim 8, wherein, while the power saving mode is activated, the controller is configured to provide the power to the I/O module to transmit the received data after storing the received data in the memory for the specified duration of time.

15. The RTU of claim 8, wherein:
the RTU comprises two or more I/O modules, and
while the power saving mode is activated, the controller is configured to provide the power to only one I/O module of the two or more I/O modules at any one period of time.

16. A method comprising:
activating a power saving mode of a Remote Terminal Unit (RTU) that selectively provides power to an Input/Output (I/O) module of the RTU to transmit and receive data communicated between one or more field devices and a controller of the RTU, the I/O module communicatively coupled between the controller and the one or more field devices; and
while the power saving mode is activated:
preventing the power from being provided to the I/O module in order to prevent the I/O module from transmitting received data,
storing the received data in a memory of the RTU for a specified duration of time when the power is not provided to the I/O module, the specified duration of time based on a current network speed, and
providing the power to the I/O module in order to allow the I/O module to transmit the received data after storing the received data in the memory of the RTU.

17. The method of claim 16, wherein the power is provided to the I/O module from one or more batteries that are charged by one or more power sources.

18. The method of claim 17, wherein activating the power saving mode comprises activating the power saving mode in response to determining that:
the one or more power sources are not charging the one or more batteries,
the one or more batteries are below a first threshold charge, or
the one or more batteries will be below the first threshold charge within a first threshold period of time.

19. The method of claim 17, further comprising:
deactivating the power saving mode in response to determining that:
the one or more power sources are charging the one or more batteries,
the one or more batteries are above a higher second threshold charge, or
the one or more batteries will be below a first threshold charge after a longer second threshold period of time.

20. The method of claim 16, further comprising:
deactivating the power saving mode,
providing power to the I/O module of the RTU, and
transmitting additional received data without storing the additional received data in the memory.

* * * * *